United States Patent
Wirth et al.

(10) Patent No.: US 12,057,695 B2
(45) Date of Patent: Aug. 6, 2024

(54) SENSOR ASSEMBLY FOR A VEHICLE

(71) Applicant: Robert Bosch GmbH, Stuttgart (DE)

(72) Inventors: Jens Wirth, Abstatt (DE); Martin Koegel, Bad Berka (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 17/599,776

(22) PCT Filed: Mar. 24, 2020

(86) PCT No.: PCT/EP2020/058176
§ 371 (c)(1),
(2) Date: Sep. 29, 2021

(87) PCT Pub. No.: WO2020/200921
PCT Pub. Date: Oct. 8, 2020

(65) Prior Publication Data
US 2022/0131364 A1    Apr. 28, 2022

(30) Foreign Application Priority Data

Apr. 1, 2019   (DE) .................... 10 2019 204 619.3

(51) Int. Cl.
*H02H 5/00*       (2006.01)
*G01P 3/44*       (2006.01)
(Continued)

(52) U.S. Cl.
CPC ................ *H02H 5/04* (2013.01); *G01P 3/44* (2013.01); *H02H 1/0007* (2013.01)

(58) Field of Classification Search
CPC .......... H02H 5/00; H02H 5/04; H02H 1/0007; G01P 3/44; G01P 3/52; G01D 3/08
(Continued)

(56) References Cited

U.S. PATENT DOCUMENTS 11,566,916 B2 *   1/2023   Wirth ..................... G01P 3/489
11,841,379 B2 *   12/2023  Wirth ..................... G01D 3/08

FOREIGN PATENT DOCUMENTS

DE    10 2016 222 628 A1    5/2018
DE    10 2017 005 071 A1    11/2018
(Continued)

OTHER PUBLICATIONS

International Search Report corresponding to PCT Application No. PCT/EP2020/058176, mailed Jun. 9, 2020 (German and English language document) (5 pages).

*Primary Examiner* — Hai L Nguyen
(74) *Attorney, Agent, or Firm* — Maginot, Moore & Beck LLP (57) ABSTRACT

The disclosure relates to a sensor assembly for a vehicle, comprising a sensor element for detecting a measurement variable and at least two control devices, each having a measuring circuit and a power source. A first connection of the sensor element is connected to the power source of a first control device. A second connection of the sensor element is connected to a ground connection via a measuring circuit of a second control device. The measuring circuit of the first control device evaluates sensor current detected in a high side path of the sensor element. The measuring circuit of the second control device evaluates sensor current detected in a low side path of the sensor element. A first emergency protective circuit provides an alternative low side path for the sensor element and receives the sensor current if the voltage drop reaches a predefined breakover voltage value.

17 Claims, 4 Drawing Sheets

(51) Int. Cl.
*H02H 1/00* (2006.01)
*H02H 5/04* (2006.01)

(58) Field of Classification Search
USPC .......................................................... 73/488
See application file for complete search history.

(56) References Cited

FOREIGN PATENT DOCUMENTS

| | | |
|---|---|---|
| JP | H8-178970 A | 7/1996 |
| JP | 2000-112541 A | 4/2000 |
| JP | 2008-26091 A | 2/2008 |
| JP | 2011-174741 A | 9/2011 |

\* cited by examiner

SENSOR ASSEMBLY FOR A VEHICLE

This application is a 35 U.S.C. § 371 National Stage Application of PCT/EP2020/058176, filed on Mar. 24, 2020, which claims the benefit of priority to Serial No. DE 10 2019 204 619.3, filed on Apr. 1, 2019 in Germany, the disclosures of which are incorporated herein by reference in their entirety.

The disclosure is based on a sensor assembly for a vehicle.

From the prior art, sensor assemblies for vehicles are known which each have a wheel sensor with at least one sensor element per vehicle wheel. The individual wheel sensors are usually connected to a vehicle braking system control device via a two-wire twisted cable, which performs, for example, ABS, ESP, ASR and/or hill-holding functions (ABS: anti-lock braking system, ESP: electronic stability program, ASR: traction control system). Usually, a first connection of the at least one sensor element is connected via the control device (high-side path) to a power source, and a second connection of the at least one sensor element is connected via the control device to ground (low-side path). A sensor current flowing through the at least one sensor element is modulated with information about the rotation rate and/or rotational speed of the corresponding vehicle wheel, wherein an evaluation and control unit of the control device evaluates the sensor current measured between the at least one sensor element and ground.

The patent DE 10 2016 222 628 A1 discloses a sensor assembly having a sensor for detecting a measurement variable and comprising a first evaluation unit with a first measuring resistor, to which a sensor signal representing the measurement variable is fed to generate a measuring voltage drop, a second evaluation unit with a second measuring resistor, to which a sensor signal representing the measurement variable is fed to generate a measuring voltage drop, a first voltage source connected to the first evaluation unit, a second voltage source connected to the second evaluation unit, and switching means that are connected to the sensor and designed in such a way that in the event of a failure of one evaluation unit, a measuring voltage drop can be generated at the measuring resistor of the other evaluation unit. In addition, the sensor is connected on the voltage side to the first voltage source via the first measuring resistor and on the ground side via the second measuring resistor to a ground point. Also, a first diode-Zener diode combination is connected in parallel with the first measuring resistor and a second diode-Zener diode combination is connected in parallel with the second measuring resistor, wherein the first and second diode-Zener diode combinations are each designed with a breakdown voltage that is greater than the measuring voltage drop, in such a way that a breakdown of the associated diode-Zener diode combination can be effected in the event of a failure of an evaluation unit. In addition, a further first diode-Zener diode combination can provided, which is arranged between the sensor and the second voltage source. In addition, one end of the second diode-Zener diode combination can be connected to a ground connection of the second evaluation unit, and a further second diode-Zener diode combination can be connected to a ground connection of the first evaluation unit.

SUMMARY

The sensor assembly for a vehicle having the features of the independent patent claim 1 has the advantage that a first emergency protection circuit monitors a low-side path and in the event of a defective low-side path provides an alternative low-side path for the sensor element without current detection, so that at least one first measuring circuit can continue to evaluate the detected sensor current. The first emergency protection circuit becomes active if the voltage drop at the second measuring connection of the sensor element exceeds, for example, a breakover voltage value which can be specified in the range from 2.0 V to 4.0 V. The active first emergency protection circuit limits the voltage drop at the second measuring connection of the sensor element, for example, to a holding voltage value in the range from approximately 0.8 V to 1.5 V and is able to accept a sensor current of up to 50 mA. Therefore, unlike a pure Zener diode structure, the emergency protection circuit of the emergency protection circuit according to the invention disclosure shows a significantly smaller voltage drop in the active state for a similar load current.

Embodiments of the present disclosure provide a sensor unit for a vehicle, said unit comprising a sensor element for detecting a measurement variable, and at least two control devices, each having a measuring circuit and a power source. A first connection of the sensor element is connected to a power source of a first control device of the at least two control devices, and a second connection of the sensor element is connected to a ground connection via a measuring circuit of a second control device of the at least two control devices. At the same time, a sensor current flowing through the sensor element is modulated with information about the detected measurement variable, wherein a measuring circuit of the first control device evaluates the sensor current detected in the high-side path between the power source and the sensor element, and a second measuring circuit of the second control device simultaneously evaluates the sensor current detected in the low-side path between the sensor element and the ground connection. In addition, a first emergency protection circuit is arranged in parallel with the low-side path and monitors a voltage drop at the second connection of the sensor element. The first emergency protection circuit provides an alternative low-side path for the sensor element and absorbs the sensor current when the voltage drop reaches a predefined breakover voltage value, so that at least the first measuring circuit can continue to evaluate the detected sensor current. In addition, the first emergency protection circuit reduces the voltage drop to a holding voltage value which is smaller than the breakover voltage value.

Such a sensor assembly for a vehicle also has the advantage that the sensor signal of the respective sensor element is available both via the tap between the power source and the sensor element (high-side path) within the first control device and via the tap between the sensor element and ground (low-side path) in the second control device, and can therefore be evaluated by two evaluation and control units simultaneously. For this purpose, a measuring circuit of a first evaluation and control unit of the first control device evaluates the sensor current detected in the high-side path, and a second measuring circuit of a second evaluation and control unit of the second control device simultaneously evaluates the sensor current detected in the low-side path. The use of only one single sensor element per measuring point, the sensor signal of which is evaluated redundantly by two control devices, results in a significant cost reduction compared to the use of two sensor elements per measuring point, with almost the same redundant evaluation reliability, because sensor signals from all measuring points are evaluated in the two control devices and the probability of failure of the sensor elements is low.

As a rule, embodiments of the sensor assembly according to the disclosure may include a plurality of sensor elements which are distributed in the vehicle at one measuring point each. Thus, embodiments of the present sensor assembly can preferably be used in a vehicle braking system. In such a braking system, for example, the measuring points can each be assigned to a vehicle wheel, wherein a corresponding sensor element can detect at least one rotation rate and/or rotation speed of the assigned vehicle wheel. Of course, the sensor elements can also be arranged at other measuring points in the vehicle. In addition, the sensor elements can also detect other measurement variables, such as temperature, pressure, etc.

The evaluation and control unit in the present case can be understood to mean an electrical circuit which processes and/or evaluates detected sensor signals. The analysis and control unit can have at least one interface which can be implemented in hardware and/or software. In the case of a hardware-based design, the interfaces can be, for example, part of a so-called system-ASIC, which includes the very wide range of functions of the analysis and control unit. It is also possible, however, that the interfaces are dedicated integrated circuits, or at least in part consist of discrete components. In the case of a software-based design, the interfaces can be software modules which exist, for example, on a micro-controller in addition to other software modules. Also advantageous is a computer program product with program code, which is stored on a machine-readable medium such as a semiconductor memory, a hard drive, or an optical memory, and is used to perform the analysis when the program is executed by the analysis and control unit.

The control device can be understood in the present case as an electrical device, such as a brake control device, which, in conjunction with a hydraulic braking system, can perform various braking functions such as ABS, ESP, ASR and/or hill-hold functions (ABS: anti-lock braking system, ESP: electronic stability program, ASR: traction control system). In this case, the two control devices can perform different braking functions during normal operation. In the event of a failure of one of the control devices, it can be provided that the other control device takes over the braking functions of the failed control device.

In the present case, a sensor element is understood to mean an electrical component which directly or indirectly detects a physical parameter or a change in a physical parameter and preferably converts it into an electrical sensor signal. This can be achieved, for example, by transmitting and/or receiving sound and/or electromagnetic waves, and/or by a magnetic field or by changing a magnetic field. One possibility is to use optical sensor elements which comprise, for example, a photo plate and/or a fluorescent surface and/or a semiconductor, which detect the impact or the intensity, wavelength, frequency, angle etc. of the received wave, such as infrared sensor elements, for example. An acoustic sensor element is also conceivable, such as an ultrasound sensor element and/or a high-frequency sensor element and/or a radar sensor element and/or a sensor element that reacts to a magnetic field, such as a Hall sensor element and/or a magneto-resistive sensor element and/or an inductive sensor element, which registers the change of a magnetic field via the voltage generated by magnetic induction, for example.

The measures and extensions listed in the dependent claims enable advantageous improvements in the sensor assembly for a vehicle, as specified in the independent claim 1.

A particular advantage is the fact that the first emergency protection circuit can automatically disconnect the alternative low-side path again when, due to an external event, the voltage drop falls below a cut-off voltage value which is smaller than the holding voltage value. For example, the reduction in the voltage drop can be caused by the original low-side path being reactivated and becoming available again.

In an advantageous embodiment of the sensor assembly, a second emergency protection circuit, the mode of operation of which is the same as the first emergency protection circuit, can be arranged in parallel with the high-side path and monitor a voltage drop at the first connection of the sensor element. The second emergency protection circuit can provide an alternative high-side path for the sensor element and absorb the sensor current when the voltage drop reaches a predefined voltage value, so that at least the second measuring circuit can continue to evaluate the detected sensor current. In addition, the second emergency protection circuit reduces the voltage drop to a holding voltage value which is smaller than the breakover voltage value. In addition, the second emergency protection circuit can automatically disconnect the alternative high-side path again if, due to an external event, the voltage drop falls below a cut-off voltage value which is smaller than the holding value. For example, the cut-off voltage value can be specified in a range from 0.4 V to 0.7 V.

In another advantageous embodiment of the sensor assembly, each emergency protection circuit can include a voltage detection and a current sink. In this case, the voltage detection activates the current sink to establish a current path between connections of the corresponding emergency protection circuit. In addition, the voltage detection can detect the voltage drop between a first connection and a second connection of the corresponding emergency protection circuit and activate the current sink if the detected voltage drop reaches the predefined breakover voltage value. In addition, the current sink can adjust the voltage drop to the predefined holding voltage value via a transistor and absorb the sensor current.

In another advantageous embodiment of the sensor assembly, the voltage detection in conjunction with a surge voltage protection can activate the current sink if the voltage drop increases in such a way that the sensor current can be reduced to a minimum current flow or completely switched off. In this way, the current sink is protected in an advantageous way against an excessive current flow or against an excessive overall loss of power, which could lead to damage to the current sink and the corresponding emergency protection circuit.

In a further advantageous embodiment of the sensor assembly, the voltage detection can stop the activation of the current sink and interrupt the current path again if the detected voltage drop falls below the predefined cut-off voltage value.

In a further advantageous embodiment of the sensor assembly, a current sensor can detect the sensor current in the high-side path and branch off a portion of the sensor current and make it available to the first measuring circuit of the first control device as a first measuring current. In this case the second measuring circuit of the second control device can receive and evaluate the sensor current directly as the second measuring current. For example, the current sensor can be looped into the current path and branch off the portion of the sensor current and pass the remaining sensor current to the sensor element. This means that the sensor current which flows into the first connection of the associated sensor element is measured and an equivalent, but significantly smaller, portion of the sensor current is passed to the first measuring circuit. This allows the power loss in the first control device to be reduced.

In a further advantageous embodiment of the sensor assembly, a switching device can connect the first connection of the sensor element to the first power source and/or to the second power source, wherein the switching device can automatically connect the first connection of the sensor element to the other power source in the event of a failure of the connected power source. In addition, the current sensor and the switching device can be combined in an interconnection module which can be implemented as an ASIC block.

Exemplary embodiments of the disclosure are shown in the drawing and will be explained in more detail in the following description. In the drawing, the same reference numbers denote the same components or elements which perform identical or similar functions.

DETAILED DESCRIPTION

As can be seen from FIGS. 1 to 6, the illustrated exemplary embodiments of a sensor assembly 1, 1A, 1B, 1C, 1D according to the disclosure for a vehicle each comprise a sensor element WSS for detecting a measurement variable, and at least two control devices ECU1, ECU1A, ECU1B, ECU1C, ECU1D, ECU2, ECU2A, ECU2B, ECU2C, ECU2D, which each have a measuring circuit MS1, MS2 and a power source VB1, VB2. In this case, a first connection WSS1 of the sensor element WSS is connected to a power source VB1 of a first control device ECU1, ECU1A, ECU1B, ECU1C, ECU1D of the at least two control devices ECU1, ECU1A, ECU1B, ECU1C, ECU1D, ECU2, ECU2A, ECU2B, ECU2C, ECU2D, and a second connection WSS2 of the sensor element WSS is connected via a measuring circuit MS1, MS2 of a second control device ECU2, ECU2A, ECU2B, ECU2C, ECU2D of the at least two control devices ECU1, ECU1A, ECU1B, ECU1C, ECU1D, ECU2, ECU2A, ECU2B, ECU2C, ECU2D to a ground connection GND. A sensor current Is flowing through the sensor element WSS is modulated with information about the measurement variable, wherein a first measuring circuit MS1 of the first control device ECU1, ECU1A, ECU1B, ECU1C, ECU1D evaluates the sensor current Is detected in the high-side path between the power source VB1 and the sensor element WSS, and a second measuring circuit MS2 of the second control device ECU2, ECU2A, ECU2B, ECU2C, ECU2D simultaneously evaluates the sensor current Is detected in the low-side path between the sensor element WSS and the ground connection GND. Furthermore, a first emergency protection circuit 20A is arranged in parallel with the low-side path and monitors a voltage drop U12 at the second connection WSS2 of the sensor element WSS. The first emergency protection circuit 20A provides an alternative low-side path for the sensor element WSS and receives absorbs the sensor current Is when the voltage drop U12 reaches a predefined breakover voltage value UK shown in FIG. 7, so that at least the first measuring circuit MS1 can continue to evaluate the detected sensor current Is. In addition, the first emergency protection circuit 20A reduces the voltage drop U12 to a holding voltage value UH shown in FIG. 7, which is smaller than the breakover voltage value UK.

As can also be seen from FIGS. 1 to 4, the two control devices ECU1, ECU1A, ECU1B, ECU1C, ECU1D, ECU2, ECU2A, ECU2B, ECU2C, ECU2D in each of the illustrated exemplary embodiments comprise an evaluation and control unit 3A, 3B, implemented as an ASIC, in which the respective measuring circuit MS1, MS2 is integrated, and a power source VB1, VB2. In this case, in each first control device ECU1, ECU1A, ECU1B, ECU1C, ECU1D, a first evaluation and control unit 3A is connected to the first power source VB1. In each second control device ECU2, ECU2A, ECU2B, ECU2C, ECU2D, a second evaluation and control unit 3B is connected to the second power source VB2.

As a rule, embodiments of the vehicle sensor assembly 1, 1A, 1B, 1C, 1D according to the disclosure comprise a plurality of measuring points, each having such a sensor element WSS. For reasons of clarity, only one of the sensor elements WSS is shown in each of FIGS. 1, 2, 3 and 4. Thus, embodiments of the present sensor assembly 1, 1A, 1B, 1C, 1D can preferably be used in a vehicle braking system. In such a braking system, for example, the measuring points can each be assigned to a vehicle wheel, wherein the sensor elements WSS can detect at least one rotation rate and/or rotation speed of the corresponding vehicle wheel. In a standard four-wheel passenger car, the sensor assembly 1, 1A, 1B, 1C, 1D therefore has four such sensor elements WSS. Of course, other measurement variables, such as temperature, pressure, etc., can also be detected at these measuring points.

The first emergency protection circuit 20A in the exemplary embodiment shown automatically disconnects the alternative low-side path again if, due to an external event, the voltage drop U12 falls below a cut-off voltage value ABS which is smaller than the holding voltage value UH. The functioning of the first emergency protection circuit 20A is described in detail below with reference to FIGS. 5 to 7.

Figure 1:
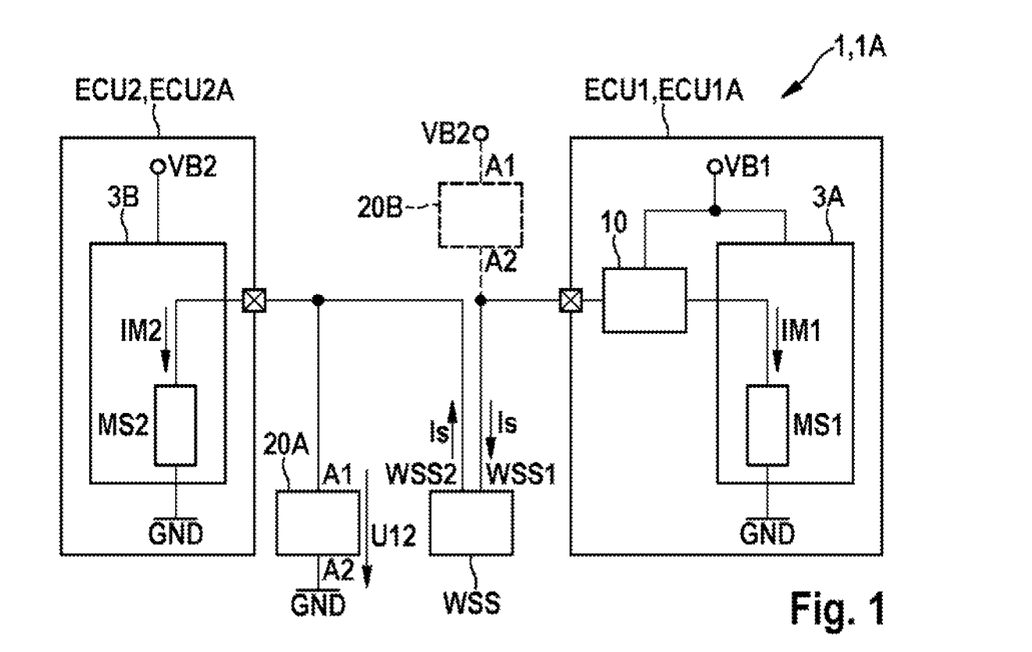
FIG. 1 shows a schematic block diagram of a first exemplary embodiment of a sensor assembly according to the disclosure for a vehicle.
Figure 2:
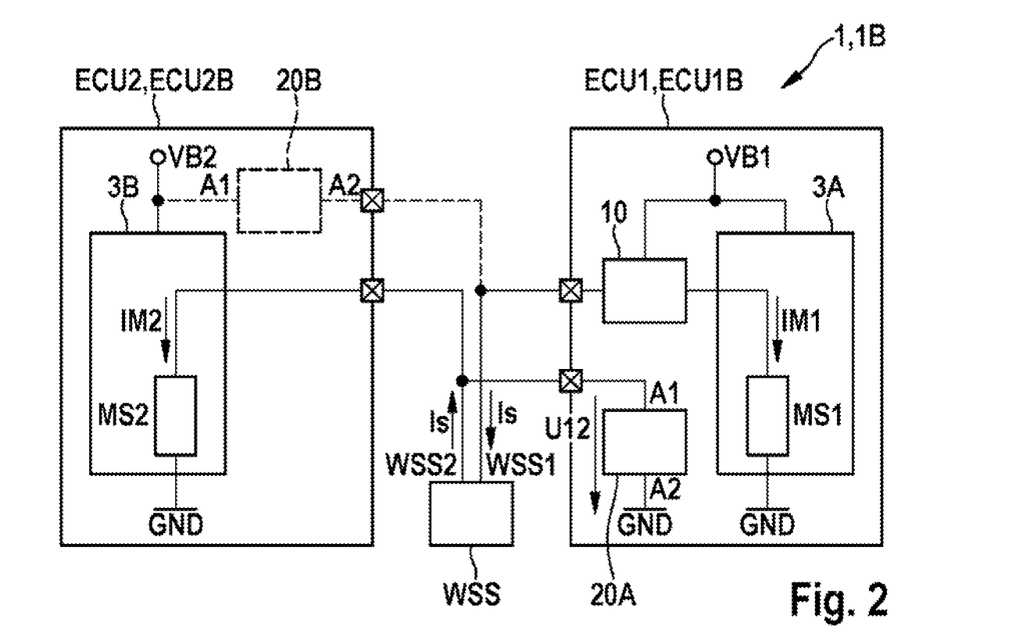
FIG. 2 shows a schematic block diagram of a second exemplary embodiment of a sensor assembly according to the disclosure for a vehicle.

As can also be seen from FIGS. 1 and 2, in the illustrated exemplary embodiments of the sensor assembly 1 according to the disclosure, an optional second emergency protection circuit 20B is provided, shown dotted in each case, which is arranged in parallel with the high-side path and monitors a voltage drop U12 at the first connection WSS1 of the sensor element WSS. The second emergency protection circuit 20B provides an alternative high-side path for the sensor element WSS and absorbs the sensor current Is so that at least the second measuring circuit MS2 can continue to evaluate the detected sensor current Is when the voltage drop U12 reaches a predefined breakover voltage value UK, wherein the second emergency protection circuit 20B additionally reduces the voltage drop U12 to a holding voltage value UH which is smaller than the breakover voltage value UK. The second emergency protection circuit 20B automatically disconnects the alternative high-side path again if, due to an external event, the voltage drop U12 falls below a cut-off voltage value ABS which is smaller than the holding voltage value UH.

The structure and functioning of the two emergency protection circuits is identical and is described together in detail below with reference to FIGS. 5 to 7.

Figure 5:
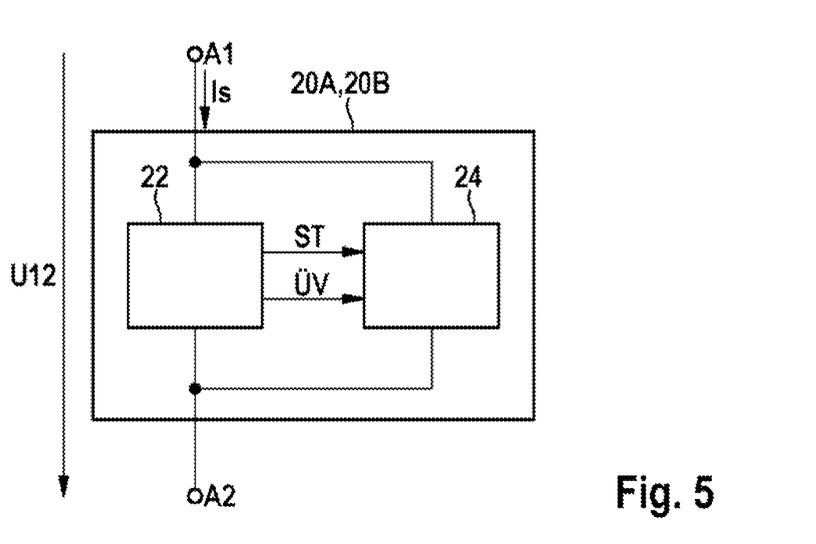
FIG. 5 shows a schematic block diagram of an exemplary embodiment of an emergency protection circuit of the sensor assembly according to the disclosure for a vehicle from FIGS. 1 to 4.
Figure 6:
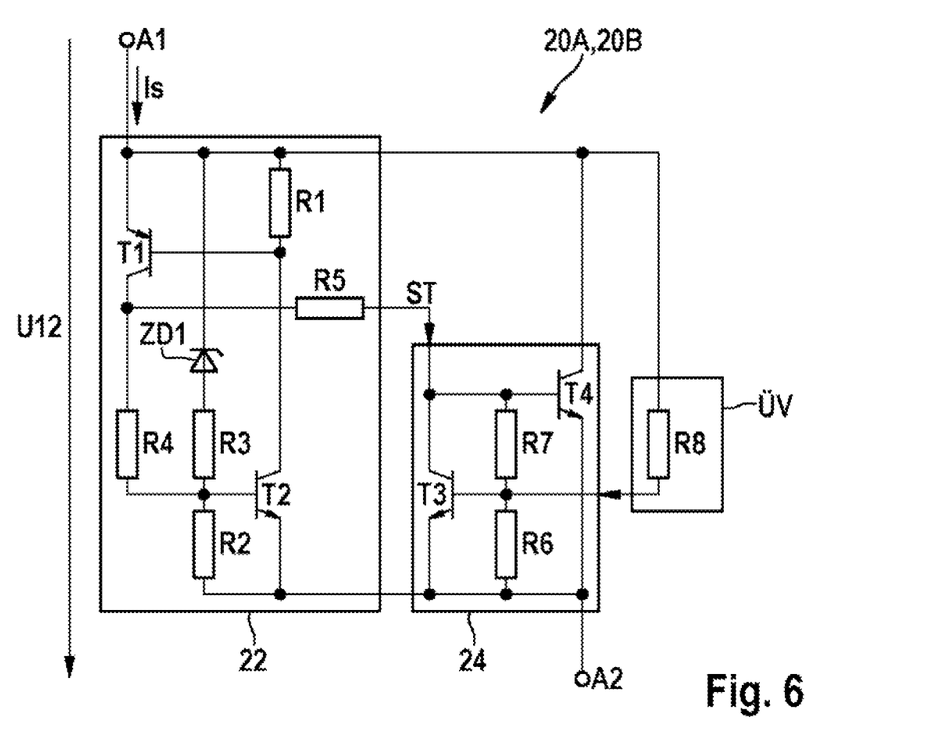
FIG. 6 shows a circuit diagram of the emergency protection circuit of FIG. 5.

As can also be seen from FIGS. 5 and 6, the emergency protection circuits 20A, 20B each comprise a voltage detection 22 and a current sink 24. In this case, the voltage detection 22 activates the current sink 24 to establish a current path between connections A1, A2 of the corresponding emergency protection circuit 20A, 20B. The voltage detection 22 detects the voltage drop U12 between a first connection A1 and a second connection A2 of the corresponding emergency protection circuit 20A, 20B and activates the current sink 24 if the detected voltage drop U12 reaches the predefined breakover voltage value UK, shown in FIG. 7. The current sink 24 sets the voltage drop U12 to the holding voltage value UH and absorbs the sensor current Is. This characteristic curve is illustrated in FIG. 7 by a solid line. In conjunction with a surge voltage protection ÜV the voltage detection 22 activates the current sink 24 in the event of an increasing voltage drop U12, in such a way that the sensor current Is is reduced to a minimum current flow or is completely switched off. This protection characteristic SV is illustrated in FIG. 7 by a dotted line. The voltage detection 22 stops the activation of the current sink 24 and interrupts the current path again if the detected voltage drop U12 falls below the predefined cut-off voltage value ABS. This cut-off characteristic is illustrated in FIG. 7 by a dashed line.

As can also be seen from FIG. 6, the voltage detection 22 in the illustrated exemplary embodiment comprises a plurality of ohmic resistors R1, R2, R3, R4 and R5, two bipolar transistors T1, T2 and a Zener diode ZD1, which are interconnected via corresponding conductors as shown, wherein a first transistor T1 is implemented as a PNP transistor and a second transistor T2 as an NPN transistor. In the exemplary embodiment shown, the current sink 24 comprises two ohmic resistors R6 and R7 and two transistors T3 and T4 which are implemented as bipolar transistors and interconnected via corresponding conductors as shown, wherein both transistors T3 and T4 are implemented as NPN transistors. In the exemplary embodiment shown, the overvoltage protection ÜV comprises an ohmic resistor R8.

As can also be seen from FIG. 6, the resistors R1, R2 and R6 are leakage resistors for the bases of transistors T1, T2, T3 in order to keep them in the blocking mode and to discharge leakage currents. If a larger current flows through the Zener diode ZD1 than through a second resistor R2, the second transistor T2 is then activated, which activates the first transistor T1. This is the case in the exemplary embodiment shown if the voltage drop U12 exceeds the breakover voltage value UK of approximately 3V. This breakover voltage value corresponds to the sum of the breakdown voltage (approximately 2.3 V) of the Zener diode and the base-emitter voltage (approximately 0.7 V) of the second transistor T2. The first transistor T1 supplies current via a fourth resistor R4 to the base of the second transistor T2 so that the latter remains in the conductive state. The second transistor T2 and the first transistor T1 form a thyristor structure and bridge the Zener diode ZD1, so that the voltage drop U12 is set to the holding voltage value UH of approximately 0.9 V. The fourth transistor T4 of the current sink 24 is activated via a fifth resistor R5 and a control line ST, wherein the sensor current Is now flowing through the fourth transistor T4 is limited to approximately 40 mA in the illustrated exemplary embodiment. In the case of a very high activation current in the control line ST, the third transistor T3 of the current sink 24 accepts a portion of the activation current for the fourth transistor T4 to protect it.

Figure 7:
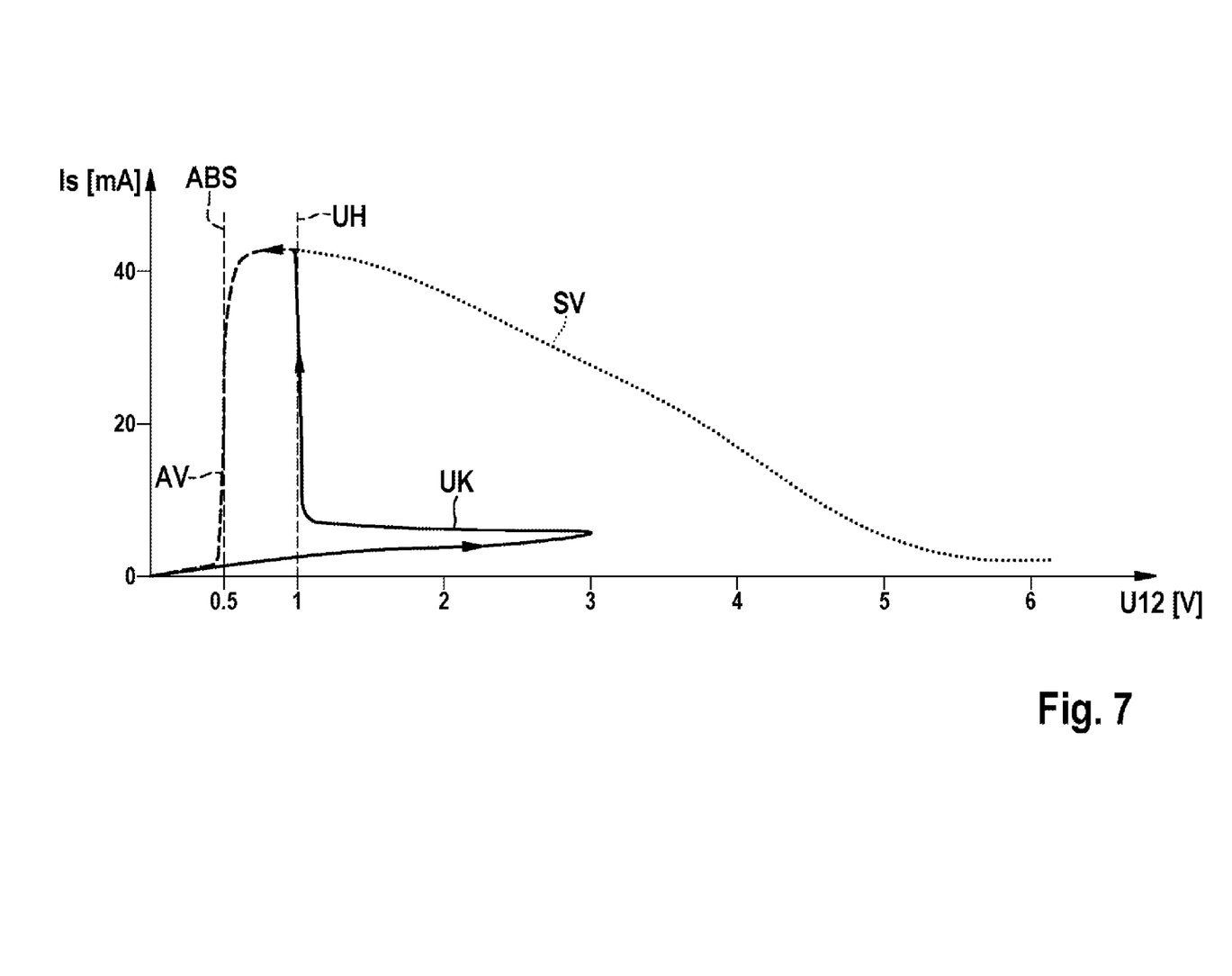
FIG. 7 shows a schematic current-voltage diagram of the emergency protection circuit from FIGS. 5 and 6.

In the event of overvoltage, which is shown in FIG. 7 by the dotted protection characteristic SV and can be triggered, for example, by a short circuit to one of the supply voltages VB1, VB2, if the current sink 24 is offered a current that is greater than a maximum load current of the current sink 24, the current sink 24 can then no longer hold the low holding voltage value UH of the voltage drop U12 of approximately 0.9 V. Therefore, the current through the eighth resistor R8 of the overvoltage protection ÜV increases. As a result, the third transistor T3 is activated more strongly and the activation of the fourth transistor T4 is reduced. This reduces the current into the base of the fourth transistor T4 and the fourth transistor T4 is also closed and protected against damage (overload protection). In the event of a short-circuit, the fourth transistor T4 can be transferred to the blocking state.

If an external event, such as switching on the original low-side path again in the second control device ECU2, reduces the voltage U12 to the cut-off voltage value ABS of approximately 0.6 V, then the thyristor structure consisting of the transistors T1 and T2 is switched off again. This cut-off characteristic is illustrated in FIG. 7 by a dashed line.

As can be seen further from FIGS. 1 to 4, the sensor assemblies 1, 1A, 1B, 1C and 1D for a vehicle in the illustrated exemplary embodiments each comprise a current sensor 10, which detects the sensor current Is in the high-side path and branches off a fraction Is/n of the sensor current Is and provides it to the first measuring circuit MS1 of the first control device ECU1, ECU1A, ECU1B, ECU1C, ECU1D as a first measuring current IM1. In addition, the current sensor 10 conducts the sensor current $I_s$ to the first connection WSS1 of the associated sensor element WSS. In this case, the second measuring circuit MS2 of the second control device ECU2, ECU2A, ECU2B, ECU2C, ECU2D in the illustrated exemplary embodiments receives the sensor current Is directly as the second measuring current IM2 and evaluates it. The current sensor 10 measures the sensor current $I_s$, which flows into the first connection WSS1 of the sensor element WSS, and an equivalent, but significantly smaller, current $I_s/n$ is fed to the first evaluation and control unit 3A to reduce the power loss in the first control device ECU1, ECU1A, ECU1B, ECU1C, ECU1D. In the evaluation of the first measuring current IM1, the first evaluation and control unit 3A takes into account the reduction made to the second measuring current. For this purpose, an appropriate adjustment of an input circuit of the first measuring circuit MS1 or the evaluation algorithm can be made.

As can also be seen from FIG. 1, the first emergency protection circuit 20A and the optional second emergency protection circuit 20B in the first exemplary embodiment of the vehicle sensor assembly 1A shown are each implemented as separate modules, and are not integrated into one of the two control devices ECU1A, ECU2A. The current sensor 10, however, which detects the sensor current Is in the high-side path and branches off a fraction Is/n of the sensor current, is integrated into the first control device ECU1A in the first exemplary embodiment shown.

As can also seen from FIG. 2, the first emergency protection circuit 20A in the second exemplary embodiment of the vehicle sensor assembly 1B shown is integrated into the first control device ECU1A. In the second illustrated exemplary embodiment of the vehicle sensor assembly 1B the optional second emergency protection circuit 20B is integrated into the second control device ECU2B. The current sensor 10 is integrated into the first control device ECU1B in the same way as in the first exemplary embodiment.

Figure 3:
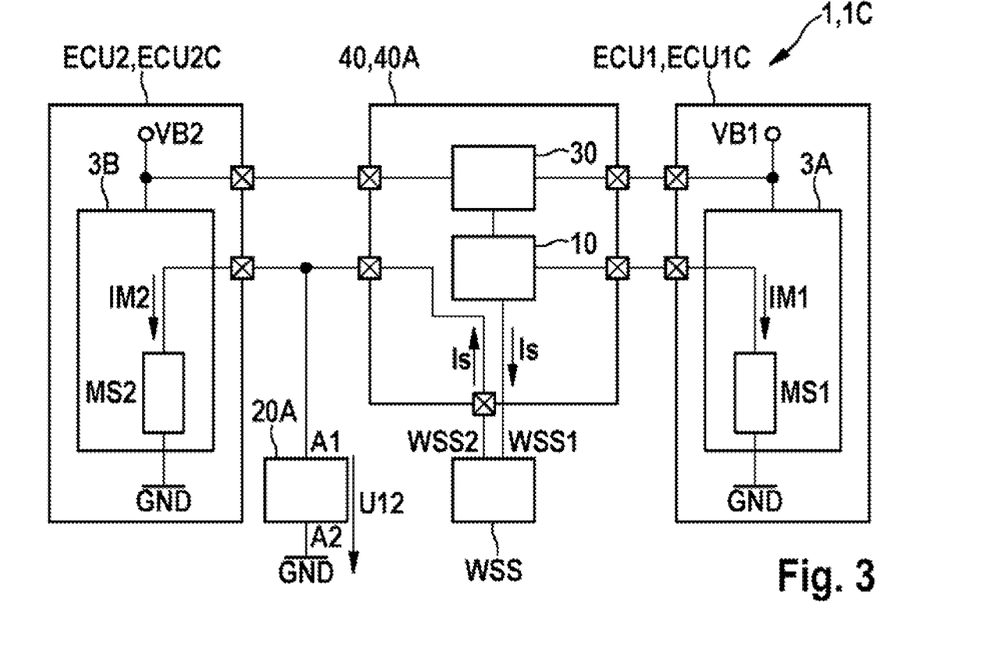
FIG. 3 shows a schematic block diagram of a third exemplary embodiment of a sensor assembly according to the disclosure for a vehicle.
Figure 4:
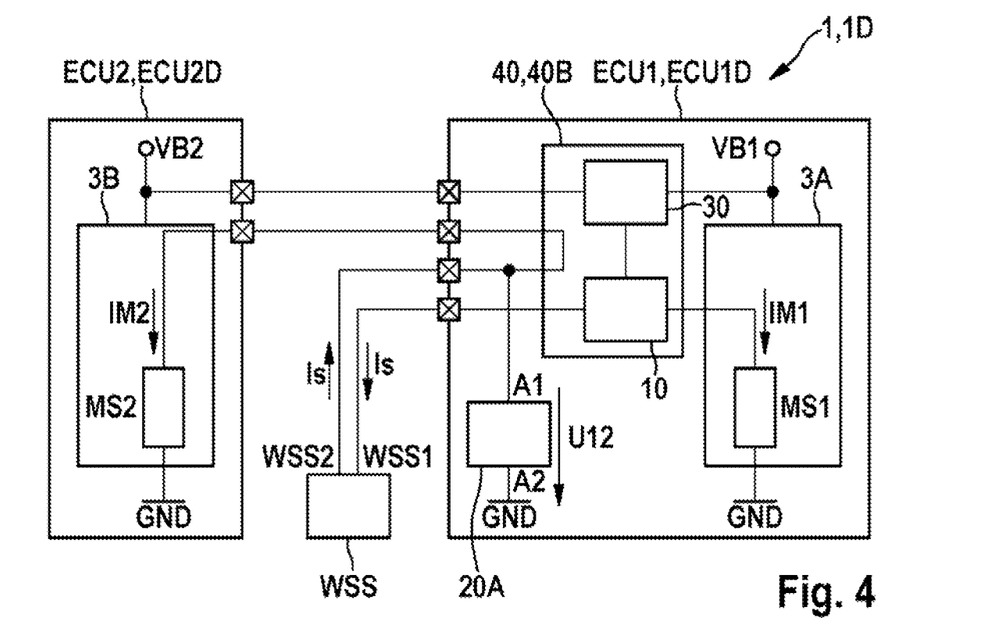
FIG. 4 shows a schematic block diagram of a fourth exemplary embodiment of a sensor assembly according to the disclosure for a vehicle.

As can be seen further from FIGS. 3 and 4, in the illustrated exemplary embodiments the sensor assemblies 1C, 1D for a vehicle each comprise a switching device 30 which connects the first connection WSS1 of the sensor element WSS to the first power source VB1 of the first control device ECU1C, ECU1D and/or to the second power source VB2 of the second control device ECU2C, ECU2D. In the event of failure of the connected power source VB1, VB2, the switching device 30 automatically connects the first connection WSS1 of the sensor element WSS to the other power source VB2, VB1. Preferably, the switching device 30 connects the first connection WSS1 of the sensor element WSS to the first power source VB1 of the first control device ECU1C, ECU1D. If the first power source VB1 fails, the switching device 30 then connects the first connection WSS1 of the sensor element WSS to the second power source VB2 of the second control device ECU2C, ECU2D.

As can also be seen from FIGS. 3 and 4, the current sensor 10 and the switching device 30 in the illustrated exemplary embodiments are combined in an interconnection module 40 which can be implemented as an ASIC component, for example.

As can also be seen from FIG. 3, the first emergency protection circuit 20A in the third exemplary embodiment of the sensor assembly 1C for a vehicle illustrated is implemented as a separate module and is not integrated into one of the two control devices ECU1C, ECU2C. The interconnection module 40 is also implemented as a separate assembly and is not integrated into one of the control devices ECU1C, ECU2C. In an alternative exemplary embodiment not shown, however, the first emergency protection circuit 20A can be integrated into the first control device ECU1C in a similar way to the second exemplary embodiment of the sensor assembly 1B.

As can also be seen from FIG. 4, the first emergency protection circuit 20A in the fourth exemplary embodiment of the sensor assembly 1D for a vehicle illustrated is integrated into the first control device ECU1D. The interconnection module 40 is also integrated into the first control device ECU1D. In an alternative exemplary embodiment not shown, however, the first emergency protection circuit 20A can be implemented as a separate module, analogously to the first and third exemplary embodiments of the sensor assembly 1B, and not be integrated into the first control device ECU1C.

The invention claimed is:

1. A sensor assembly for a vehicle, the sensor assembly comprising:
a sensor element configured to detect a measurement variable, a sensor current flowing through the sensor element being modulated with information about the measurement variable;
a first emergency protection circuit; and
at least two control devices, each of the at least two control devices having a respective measuring circuit and a respective power source,
wherein a first connection of the sensor element is connected to the respective power source of a first control device of the at least two control devices, and a second connection of the sensor element is connected to a ground connection via the respective measuring circuit of a second control device of the at least two control devices,
wherein the respective measuring circuit of the first control device is configured to evaluate the sensor current detected in a high-side path between the respective power source of the first control device and the sensor element and the respective measuring circuit of the second control device is configured to simultaneously evaluate the sensor current detected in a low-side path between the sensor element and the ground connection,
wherein the first emergency protection circuit is arranged in parallel with the low-side path and is configured to monitor a first voltage drop at the second connection of the sensor element,
wherein the first emergency protection circuit is configured to provide an alternative low-side path for the sensor element and to absorb the sensor current in response to the first voltage drop reaching a predefined breakover voltage value such that at least the respective measuring circuit of the first control device can continue to evaluate the sensor current, and
wherein the first emergency protection circuit is configured to reduce the first voltage drop to a holding voltage value that is smaller than the breakover voltage value.

2. The sensor assembly as claimed in claim 1, wherein the first emergency protection circuit is configured to automatically disconnect the alternative low-side path again in response to, due to an external event, the first voltage drop falling below a cut-off voltage value that is smaller than the holding voltage value.

3. The sensor assembly as claimed in claim 1, further comprising:
a second emergency protection circuit arranged in parallel with the high-side path and configured to monitor a second voltage drop at the first connection of the sensor element,
wherein the second emergency protection circuit is configured to provide an alternative high-side path for the sensor element and absorb the sensor current in response to the second voltage drop reaching the predefined breakover voltage such that at least the respective measuring circuit of the second control device can continue to evaluate the sensor current,
wherein the second emergency protection circuit is configured to reduce the second voltage drop to a holding voltage value that is smaller than the breakover voltage value.

4. The sensor assembly as claimed in claim 3, wherein the second emergency protection circuit is configured to automatically disconnect the alternative high-side path again in response to, due to an external event, the voltage drop falling below a cut-off voltage value that is smaller than the holding voltage value.

5. The sensor assembly as claimed in claim 1, wherein the first emergency protection circuit includes a voltage detection and a current sink, the voltage detection being configured to activate the current sink to establish a current path between connections of the first emergency protection circuit.

6. The sensor assembly as claimed in claim 5, wherein the voltage detection is configured to detect the first voltage drop between a first connection and a second connection of the first emergency protection circuit and activate the current sink in response to the first voltage drop reaching the predefined breakover voltage value.

7. The sensor assembly as claimed in claim 6, wherein the current sink is configured to set the first voltage drop to the predefined holding voltage value and absorb the sensor current.

8. The sensor assembly as claimed in claim 7, wherein the voltage detection is configured to, in conjunction with a surge voltage protection, activate the current sink in response to an increasing of the first voltage drop such that the sensor current is one of (i) reduced to a minimum current flow and (ii) completely switched off.

9. The sensor assembly as claimed in claim 5, wherein the voltage detection is configured to stop the activation of the current sink and interrupt the current path again in response to the first voltage drop falling below a predefined cut-off voltage value.

10. The sensor assembly as claimed in claim 5, wherein the current sink comprises two ohmic resistors and two transistors.

11. The sensor assembly as claimed in claim 10, wherein the two ohmic resistors are connected in series.

12. The sensor assembly as claimed in claim 1, wherein the sensor element is configured to detect, as the measurement variable, at least one of a rotation rate, a rotational speed, a pressure, and a temperature.

13. The sensor assembly as claimed in claim 1, further comprising:
a current sensor configured to detect the sensor current in the high-side path, branch off a fraction of the sensor current, and make the fraction of the sensor current available to the first measuring circuit of the first control device as a first measuring current,
wherein the second measuring circuit of the second control device is configured to receive and evaluate the sensor current directly as a second measuring current.

14. The sensor assembly as claimed in claim 1, the sensor element comprising:
a plurality of sensor elements, each sensor element of the plurality of sensor elements being arranged at a respective measuring point.

15. The sensor assembly as claimed in claim 14, wherein each of the respective measuring points are assigned to a respective vehicle wheel, the associated sensor element in the plurality of sensor elements is configured to detect at least one of a rotation rate and rotation speed of the respective vehicle wheel.

16. A sensor assembly for a vehicle, the sensor assembly comprising:
a sensor element configured to detect a measurement variable, a sensor current flowing through the sensor element being modulated with information about the measurement variable;
a first emergency protection circuit;
at least two control devices, each of the at least two control devices having a respective measuring circuit and a respective power source;
a current sensor; and
a switching device,
wherein a first connection of the sensor element is connected to the respective power source of a first control device of the at least two control devices, and a second connection of the sensor element is connected to a ground connection via the respective measuring circuit of a second control device of the at least two control devices,
wherein the respective measuring circuit of the first control device is configured to evaluate the sensor current detected in a high-side path between the respective power source of the first control device and the sensor element and the respective measuring circuit of the second control device is configured to simultaneously evaluate the sensor current detected in a low-side path between the sensor element and the ground connection,
wherein the first emergency protection circuit is arranged in parallel with the low-side path and is configured to monitor a first voltage drop at the second connection of the sensor element,
wherein the first emergency protection circuit is configured to provide an alternative low-side path for the sensor element and to absorb the sensor current in response to the first voltage drop reaching a predefined breakover voltage value such that at least the respective measuring circuit of the first control device can continue to evaluate the sensor current,
wherein the first emergency protection circuit is configured to reduce the first voltage drop to a holding voltage value that is smaller than the breakover voltage value,
wherein the current sensor is configured to detect the sensor current in the high-side path, branch off a fraction of the sensor current, and make the fraction of the sensor current available to the first measuring circuit of the first control device as a first measuring current,
wherein the second measuring circuit of the second control device is configured to receive and evaluate the sensor current directly as a second measuring current,
wherein the switching device is configured to connect the first connection of the sensor element to the respective power source of one of the first control device and second control device, and
wherein the switching device is configured to automatically connect the first connection of the sensor element to the respective power source of another of the first control device and second control device in response to a failure of the respective power source of the one of the first control device and second control device.

17. The sensor assembly as claimed in claim 16, wherein:
the current sensor and the switching device are combined in an interconnection module, and
the interconnection module is implemented as an ASIC component.

* * * * *